Oct. 7, 1958 R. E. BAKER ET AL 2,855,589

SIGNAL DISPLAY SYSTEM

Filed May 8, 1951

INVENTOR
RICHARD E. BAKER AND
FRANK D. COVELY
BY J. L. Whittaker
ATTORNEY 2,855,589

SIGNAL DISPLAY SYSTEM

Richard E. Baker, Indianapolis, Ind., and Frank D. Covely, Collingswood, N. J., assignors, by mesne assignments, to the United States of America as represented by the Secretary of the Navy Application May 8, 1951, Serial No. 225,230

15 Claims. (Cl. 343—7.7)

Figures 1, 2:
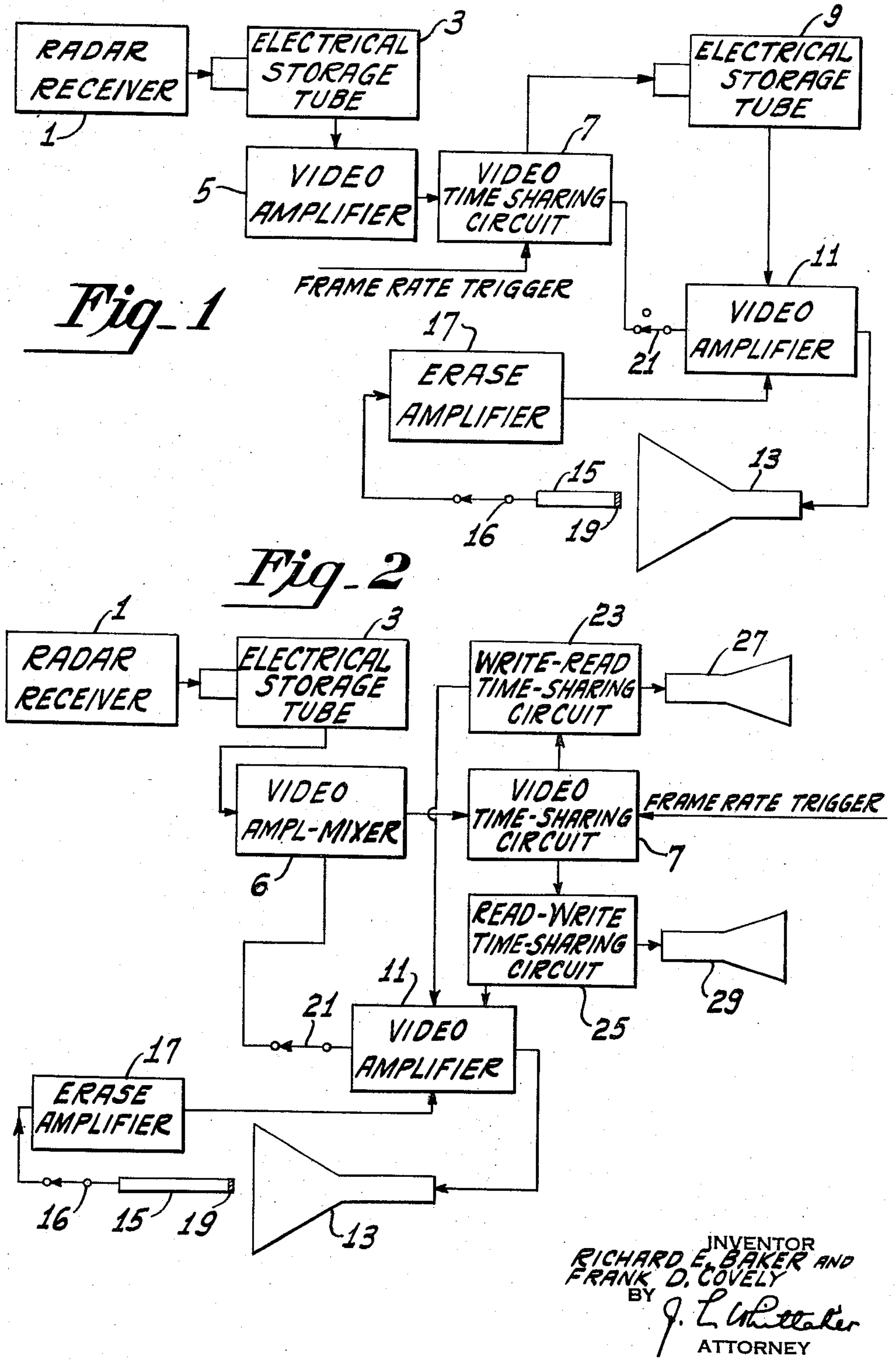

This invention relates generally to electrical energy storage systems and more particularly to a continuous energy storage system which includes means for selectively erasing undesired portions of the stored energy. The present application is related to a copending application Serial No. 225,197, entitled "Signal Storage System" which was filed the date of this application by Leslie E. Flory, now U. S. Patent No. 2,702,356. Said copending application discloses and claims an improvement upon the continuous storage features hereinafter disclosed.

A system for continuously storing electrical energy is of particular utility as an aid to navigation. For example, continuous storage of a large number of successive P. P. I. radar displays and conversion thereof into a composite television picture provides an automatic television plot of all radar targets within the service area of the P. P. I. radar system. Observation of this television display by an observer (possibly a ship's navigator, aircraft traffic control personnel, or the like) enables the observer to derive therefrom information relating to the ranges, bearings, and courses being pursued by various remote wave reflecting objects thus displayed.

Since a system of this kind affords a continuous television display of certain remote objects, it may be desirable, after sufficietly observing a particular moving target, to eliminate television display indications attributable to that target. This selective target erasing then eliminates indications of radar targets no longer to be considered and "cleans up" the television picture so that the information obtained from the remaining targets therein displayed is more intelligible.

It is an object of the present invention to provide an electrical energy storage system in which there is continuous storage of electrical energy.

Another object of the invention is to provide a system for continuous storage of electrical energy including the feature of selectively erasing portions of energy stored therein.

Another object of the invention is to provide a system for continuous storage of electrical information utilizing a converter type electrical storage tube.

In a typical embodiment according to the present invention, received P. P. I. radar video signals containing target information in polar coordinates are converted into television video signals representing information in rectangular coordinates by means of a suitable signal converter storage tube. Alternate frames of this new television video information are displayed on a second, or "composite," electrical storage tube. The reading beam of this second storage tube reads the video information therefrom and during the remaining alternate television frames, by means of a feedback loop, rewrites the information on this same second storage tube.

The storage time of the "composite" tube is adjusted such that the new information thus read, and rewritten as old information, is applied thereto at intervals less than the adjusted tube storage time; hence, old information is never lost but is constantly rewritten and new information is periodically added to the old. It is clear that if the feedback loop for rewriting old information is disabled at a particular instant of time, the video information being fed back therein at that instant of time is lost because of the short memory of the composite storage tube.

The selective erasure feature circuitry includes a television kinescope for monitoring the output of the composite information storage tube and a photoelectric device responsive to the impingement of the kinescope electron beam bombarding the kinescope phosphor. Suitable wave signals derived from the photoelectric device are applied to and selectively instantaneously disable the above-mentioned feedback loop removing information transmitted therein.

A further embodiment, according to the invention, is disclosed in which a pair of barrier grid storage tubes are utilized in continuously storing desired information.

The invention will be described in greater detail with reference to the accompanying drawing in which Figure 1 is a schematic block diagram of a system, according to the invention, utilizing a single electrical storage tube for continuous storage of electrical information which system includes means for selectively erasing portions of this stored information; and Figure 2 is a schematic block diagram of a continuous energy storage system, according to the invention, in which a pair of barrier grid storage tubes are utilized. Similar reference characters are applied to similar elements throughout the drawings.

Referring to Fig. 1 of the drawing, P. P. I. radar information in polar coordinates, is obtained from a P. P. I. radar receiver 1 and is applied to and stored within a converter type electrical storage tube 3, substantially as shown and described in a copending application Serial No. 29,746, filed May 28, 1948, by L. Pensak and entitled Electrical Storage Tube, now abandoned. In the storage tube 3 the P. P. I. system radar display is converted into appropriate television video signals which are then amplified in a video amplifier 5 and coupled to a video time-sharing circuit 7. The video time sharing circuit 7 is triggered at the television system frame repetition rate and effectively acts as a switching device such that alternate frames of television video information derived from the converter type storage tube 3 are applied to and modulate the reading beam of a second electrical storage tube 9, substantially identical to said first storage tube 3.

The new video information thus applied to the second storage tube 9 on alternate television frames is read therefrom, is amplified in a video amplifier 11, and is fed back as old information to the video time-sharing circuit 7. The feedback video signals from the time-sharer then modulate the storage tube writing beam on the remaining alternate television frames.

The storage time of this second storage tube 9 is adjusted such that it is slightly greater than the time duration for the writing of one frame of television video information. The system disclosed operates cyclically and provides a continuous television plot of radar targets since a frame of new information is periodically added to the old information stored on the storage tube target. One frame time later the composite information previously derived becomes old and the cycle repeats. A television kinescope 13 monitors the video signal output from the before-mentioned video television signal amplifier 11 and provides a continuous plot television display, in rectangular coordinates, of the converted radar P. P. I. display.

It may be seen that a continuous television plot of successive P. P. I. radar displays is extremely useful. Assume, however, that the flight characteristics of a particular aircraft have sufficiently been observed and the craft has subsequently flown out of the P. P. I. radar system service area. The kinescope display retains the image of the aircraft's flight course because of the continuous storage features previously described. The trace may be removed by interrupting the composite storage tube video feedback loop at the particular instant of time that the video signals producing the trace are travelling therein to be rewritten on the composite storage tube 9. Because of the relatively short storage time of the tube 9, the undesired video signals are lost.

According to the instant invention, this selective erasing feature is accomplished with circuitry which includes a cascade type kinescope screen, a pencil shaped phototube 15, and an erase amplifier 17. The cascade type kinescope screen comprises a two different phosphor layers the RMA designation of which is known in the art as a P–7. At substantially the instant at which electrons impinge upon the screen a "blue light" is produced therefrom. An orange afterglow subsequently produced translates the electron bombardment of the screen into an appropriate television display. The pencil shaped phototube 15 includes an aperture in the end disposed toward the kinescope screen, across which aperture is a filter material 19 which passes only the "blue light."

In operation of the system removal of an undesired moving target kinescope trace is accomplished in the following manner. The pencil shaped phototube 15 (a photomultiplier) is slowly wiped across the glass face of the television kinescope 13 where the objectionable trace appears. "Blue light" emitted by the P–7 cascade type screen at the time at which the kinescope electron beam impinges on the screen, is passed by the filter 19, and activates the phototube 15 from which video signals are obtained corresponding to the video signals producing the target trace to be removed. The phototube video output, by means of a switch 16, is then applied to the erase amplifier 17 from which substantially square wave output signals are derived for each video input signal applied thereto. These video signals converted to square waves are applied to and disable the composite storage tube feedback loop for the period of the converted video signals.

Assuming that the trace to be removed is a quarter of an inch long, the manual erasing time may be on the order of one second. If the frame rate is thirty frames per second, of which fifteen frames per second are rewritten by means of the feedback loop as old information, then the target trace is incrementally erased by periodically disabling the feedback loop during this time. It should be noted that only the past traces of selected moving targets may be eradicated with this system. Stationary targets and subsequent movements of the old moving targets are still plotted.

In the event that it is desirable to eradicate traces of all the radar targets displayed on the kinescope, a total erase switch 21 is provided in the composite storage tube feedback loop.

Referring to Figure 2 of the drawing, radar video signals are converted to television in an electrical storage tube 3, as previously referenced. The television video signals are amplified in a video amplifier-mixer 6 and applied to a frame rate video time-sharing circuit 7. Connected to the output of the video time sharing circuit are a Write-Read time sharing circuit 23 and a Read-Write time sharing circuit 25. The video output signals from both the Write-Read and Read-Write circuits 23 and 25 are applied to respective barrier grid storage tubes 27 and 29 and also to a video amplifier 11. The storage tubes 27 and 29 are substantially as shown and described in a copending application Serial No. 171,391 filed June 30, 1950 by Arthur S. Jensen and entitled Barrier Grid Storage Tube, now U. S. Patent No. 2,598,919.

When the system is in operation, the first frame of radar video information converted to television video in the electrical storage tube 3 is, by means of the frame rate video time sharing circuit 7 and the Write-Read circuit 23, written upon the associated barrier grid storage tube 27. During the second frame time the video output from the Write-Read circuit 23 is read from the storage tube 23 and applied to a video amplifier 11 from which it is fed back to the before-mentioned video amplifier-mixer 6. In the amplifier mixer 6 the information thus read is combined with a frame of new video information and the combination thereof, by means of the Read-Write circuit 25, is written upon its associated barrier grid storage tube 29. During the third frame period, the composite information obtained during the first and second frames is read from the second storage tube 29 and is mixed in the amplifier-mixer 6 with another new frame of video information. The new composite information is written back on the first barrier grid tube 27. The system thus continues indefinitely and provides a continuous storage of radar target information. A selective erasure circuit is provided herein and operates as above described with reference to Figure 1.

A simple correction to compensate for undesirable effects of time delay in the selective erasing circuit is to apply a frame rate square wave to the kinescope horizontal deflection coils thereby displacing the electron beam proportionately. Undesirable kinescope phosphor persistance effects may be obviated, if desired, by video clipping and/or high-frequency compensation. It may be desirable, if difficulty is encountered in obtaining accurate registry between the reading and writing beams of the electrical storage tube 9 of Fig. 1, to utilize the circuitry and storage devices of Fig. 2 wherein the registry problem is eliminated.

The cascade type kinescope screen specifically disclosed may be replaced by a single layer screen and a peak intensity output obtained therefrom be used to trigger a threshold circuit. Video compensation, of the type utilized in flying spot techniques, may be required. This circuitry, however, provides only an alternative method of producing the same end result and falls within the broad teachings of the invention.

What is claimed is:

1. A signal display system for use with a moving target radar indicating system, said signal display system including means for converting signal intelligence derived from said moving target indicating system into related television wave signals, electrical storage tube means for storing alternate frames of said converted television wave signals, feedback loop means responsive to signals read out of said electrical storage tube during conjugate alternate television frames for storing said read signals in said storage tube during said conjugate alternate television frames, television means for visually displaying said stored signals, and photoelectric means responsive to said television means for selectively erasing certain of said displayed signals.

2. A system as claimed in claim 1 wherein said feedback means includes means for totally erasing said displayed signals.

3. A signal display system for use with a moving target radar indicating system, said signal display system including a first electrical storage tube means for converting signal intelligence derived from said moving target indicating system into related television wave signals, a second electrical storage tube means for storing alternate frames of said converted television wave signals, feedback loop means responsive to signals read out of said second electrical storage tube during conjugate alternate television frames for storing said read signals in said storage tube during conjugate alternate television frames, television means for visually displaying said stored signals, and photoelectric means responsive to said television means for selectively erasing certain of said displayed signals.

4. A system as claimed in claim 3 wherein said feedback loop means includes a video amplifier and a time-sharing gate circuit, said time-sharing circuit being triggered at the television system frame repetition rate.

5. A system as claimed in claim 4 wherein the storage times of said first and second electrical storage tubes is greater than the time interval between successive frame repetition rate trigger pulses, said system including an erasing amplifier connected between said photoelectric device and said video amplifier for selectively interrupting said feedback loop means and erasing television signals applied thereto.

6. In a signal display system for use with a radar moving target indicating system which display system includes a first electrical storage tube means for converting signal intelligence derived from said moving target indicating system into related television wave signals, a second electrical storage tube means for storing said television wave signals during alternate television frames which second storage tube means operates cyclically with a third electrical tube means, compositely storing newly obtained video information from said converting means and said stored information, feedback loop means responsive to said second and third storage tube means, and television means for visually displaying said stored signals; the improvement comprising photoelectric means responsive to said television means for selectively erasing certain of said displayed signals.

7. A system as claimed in claim 6 wherein said photoelectric means includes light filter means.

8. A system as claimed in claim 6 including means wherein signals derived from said photoelectric means selectively interrupt and disable said feedback loop means.

9. A system as claimed in claim 6 wherein said feedback means includes means for totally erasing said displayed signals.

10. A signal display system comprising connection means for a source of signal intelligence, an electrical storage tube for storing signal intelligence initially derived from said source during a first interval of time, means loop connected with said storage tube and responsive to signals read out of said tube during conjugate alternate time intervals for cyclically storing said read signals during said conjugate alternate time intervals, means for visually displaying said stored signals, and means responsive to said display means for selectively erasing certain of said signals displayed thereby.

11. A signal display system as claimed in claim 10 wherein said selective erasing means includes a photomultiplier.

12. In a signal display system which includes connection means for a source of signal intelligence, an electrical storage tube for storing a signal intelligence initially derived from said source during a first interval of time, an additional electrical storage tube operating cyclically with said first named storage tube during conjugate alternate time intervals for storing intelligence newly obtained from said source and said stored intelligence, and means for visually displaying said stored signals; the improvement comprising means including a photoelectric device responsive to said display means for selectively erasing certain of said intelligence displayed thereby.

13. In a signal display system which includes connection means for a source of signal intelligence, an electrical storage tube for storing signal intelligence initially derived from said source during a first interval of time, an additional electrical storage tube loop connected with and operating cyclically with said first named storage tube during conjugate alternate time intervals for storing intelligence newly obtained from said source and said stored intelligence, and means for visually displaying said stored intelligence; the improvement comprising means including a photomultiplier responsive to said display means for erasing certain of said displayed intelligence.

14. A signal storage tube system comprising, a source of signal intelligence, an electrical storage tube including means for providing a writing beam of electrons and means for providing a reading beam of electrons, input and output circuits for said storage tube respectively associated with said writing and reading beam providing means, means for applying signals from said source to said input circuit during spaced time intervals, and means connected between said input and output circuits for applying signals from said output circuit to said input circuit in intervals between said spaced time intervals.

15. A signal storage tube system comprising, a first electrical storage tube, input and output circuits for said first storage tube, a second electrical storage tube, input and output circuits for said second storage tube, means for connecting the output circuit of said first storage tube to the input circuit of said second storage tube and for connecting the output circuit of said second storage tube to the input circuit of said first storage tube whereby said first and second storage tubes are connected in a loop circuit, means for introducing signal intelligence to be stored into said loop, means connected to said first and second storage tubes for operating said tubes so that said first and second storage tubes circulate and alternately store said introduced signal intelligence, a display device coupled to said loop circuit for visually displaying the signal intelligence circulated therein, and means coupled to said loop circuit and responsive to said display means for selectively erasing certain said signals displayed thereby.

References Cited in the file of this patent

UNITED STATES PATENTS

| | | |
|---|---|---|
| 2,403,562 | Smith | July 9, 1946 |
| 2,430,307 | Smith | Nov. 4, 1947 |
| 2,437,173 | Rutherford | Mar. 2, 1948 |
| 2,474,628 | Hurvitz | June 28, 1949 |
| 2,524,295 | Mesner | Oct. 3, 1950 |
| 2,524,296 | Mesner | Oct. 3, 1950 |
| 2,557,691 | Rieber | June 19, 1951 |

OTHER REFERENCES

Hergenrother et al.: "The Recording Storage Tube," Proc. I. R. E., July 1950, pp. 740–747 inclusive.